United States Patent
Waymire et al.

(10) Patent No.: US 10,334,989 B2
(45) Date of Patent: Jul. 2, 2019

(54) DEVICE FOR CHOPPING, TURNING, AND SERVING GROUND MEAT

(71) Applicants: Katherine Waymire, Minneapolis, MN (US); Melessa E. Paynter, St. Michael, MN (US)

(72) Inventors: Katherine Waymire, Minneapolis, MN (US); Melessa E. Paynter, St. Michael, MN (US)

(*) Notice: Subject to any disclaimer, the term of this patent is extended or adjusted under 35 U.S.C. 154(b) by 0 days.

(21) Appl. No.: 15/923,838

(22) Filed: Mar. 16, 2018

(65) Prior Publication Data
US 2018/0199763 A1    Jul. 19, 2018

Related U.S. Application Data

(63) Continuation of application No. 15/413,404, filed on Jan. 23, 2017, now abandoned.

(60) Provisional application No. 62/281,864, filed on Jan. 22, 2016.

(51) Int. Cl.
*A47J 43/28* (2006.01)
*G06Q 30/06* (2012.01)

(52) U.S. Cl.
CPC ........ *A47J 43/288* (2013.01); *G06Q 30/0623* (2013.01)

(58) Field of Classification Search
CPC .................................................. A47J 43/288
USPC .................. 294/7; 30/115, 122; D7/688, 693
See application file for complete search history.

(56) References Cited

U.S. PATENT DOCUMENTS

| | | | | | |
|---|---|---|---|---|---|
| D103,757 S | * | 3/1937 | White | ............................ | D7/652 |
| D176,158 S | * | 11/1955 | Schacht | .......................... | D7/688 |
| D187,079 S | * | 1/1960 | Horn et al. | ..................... | D7/691 |
| D243,381 S | * | 2/1977 | Kridos | ........................... | D7/688 |
| 4,205,870 A | * | 6/1980 | Conner | ................. | A47J 43/283 |
| | | | | | 294/7 |
| D304,893 S | * | 12/1989 | Scaggs | .......................... | D7/692 |
| D324,321 S | * | 3/1992 | Eckman | ......................... | D7/361 |
| D326,034 S | * | 5/1992 | Kluesner | ........................... | 294/7 |
| 5,443,293 A | * | 8/1995 | Foreman | .............. | A47J 43/288 |
| | | | | | 294/7 |
| D592,919 S | * | 5/2009 | Oliwa | ............................ | D7/688 |
| D706,094 S | * | 6/2014 | Griffin | ........................... | D7/688 |
| D746,112 S | * | 12/2015 | Holcombe | ..................... | D7/642 |
| D751,353 S | * | 3/2016 | Rose | .............................. | D7/688 |

\* cited by examiner

*Primary Examiner* — Paul T Chin
(74) *Attorney, Agent, or Firm* — Fantastic IP Consulting; Eduardo E. Drake

(57) ABSTRACT

One of the most common cooking activities is browning of ground beef, turkey, lamb, or chicken for use in various dishes from sloppy Joe's, to tacos, to spaghetti sauces, and countless others. The present inventor recognized that browning using conventional techniques and devices requires use of multiple tools that increase preparation and clean up time. In response, they devised, among other things, a single tool that allows not only effective separation and turning of the ground meat during cooking, but also serving of the ground meat. In one embodiment, the tool includes a handle with a flat spatula head having a ridged fin structure on its topside. The fin structure extends from the front edge of the spatula back toward the handle, allowing the front edge of the spatula in combination with a front most edge of the fin structure to function as chopper-separator and allowing the spatula portion to facilitate serving.

14 Claims, 1 Drawing Sheet

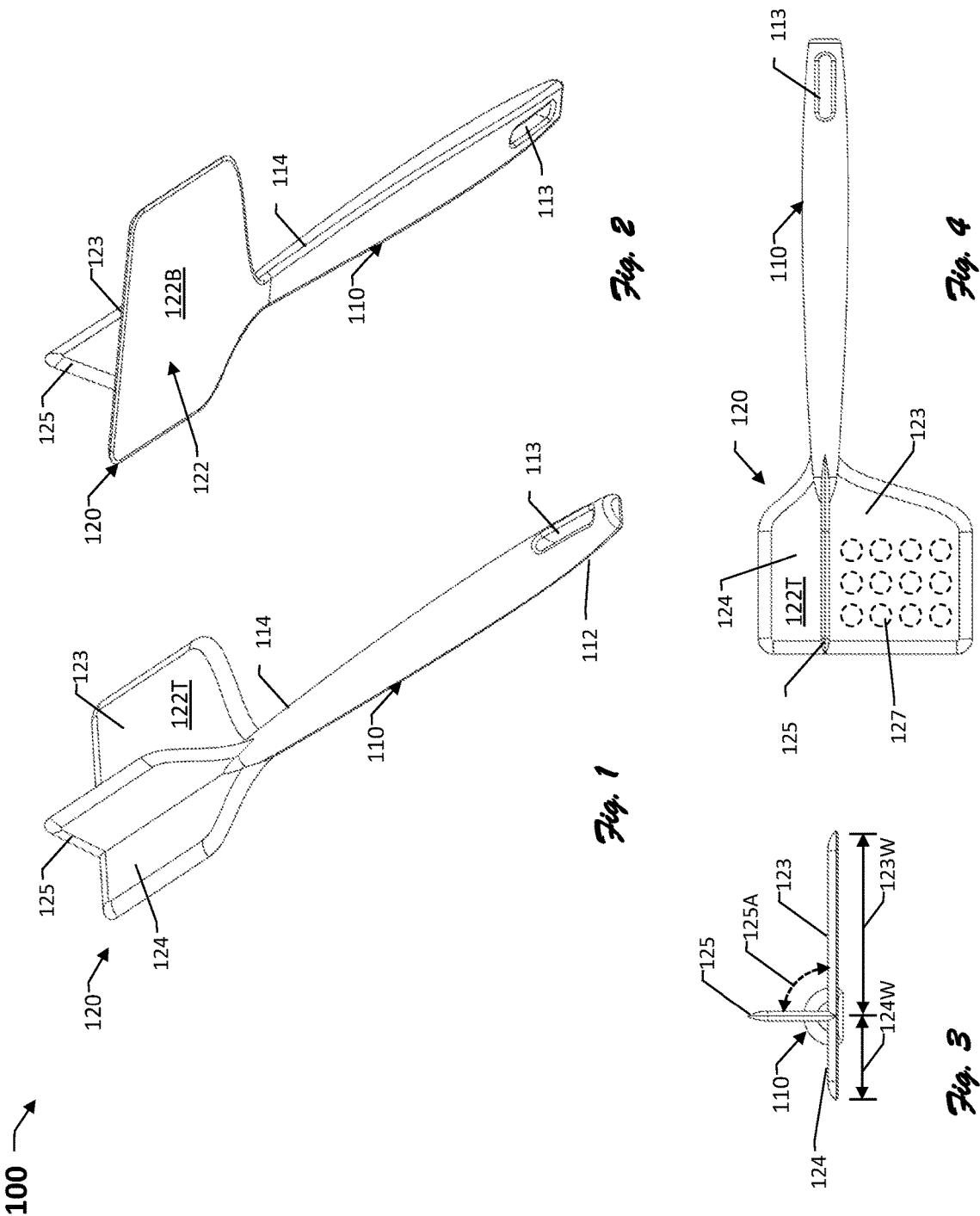

DEVICE FOR CHOPPING, TURNING, AND SERVING GROUND MEAT

RELATED APPLICATIONS

The present application is a continuation of U.S. patent application Ser. No. 15/413,404 which was filed Jan. 23, 2017, and which claims priority to U.S. Provisional Patent Application 62/281,864, which was filed on Jan. 22, 2016. Both of these applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright©2015, TALISMAN DESIGNS, LLC.

TECHNICAL FIELD

Various embodiments of the invention relate generally to hand-operated meat chopping and meat cooking tools.

BACKGROUND

In busy American households, one of the most common cooking activities is browning of ground beef, turkey, lamb, or chicken for use in various dishes from sloppy Joe's, to tacos, to spaghetti sauces, and countless others. Browning the ground meat is a simple process of separating the lumped ground meat as it cooks in a skillet into successively smaller conglomerations. However, the process is often easier said than done, since ground meat is typically moist and fatty and therefore very sticky, tending to rejoin even as a cook attempts to separate it with a spoon or spatula. As a result, many cooks resort to using a pair of tools, for example two forks or two spatulas in separate hands to pull the ground meat apart as it cooks. This process works but it also doubles the number of tools for cleanup and requires use of both hands, preventing cooks from holding their skillets in place as they work through the meat.

In partial solution of the problem, some meat-separating devices, such as described in U.S. Pat. No. 5,732,616 and sold under the ChopStir name, have been marketed with some success. The ChopStir device is a one-handed four-bladed tool, with the blades being of equal length and spaced equally around the end of a long handle to define a cross-like configuration. Notably, the equal length of the blades dictates that cooks operate the tool in a substantially vertical up and down motion to ensure full contact of the 4 blades with the ground meat.

The present inventors recognize at least one problem with the ChopStir and other similar multi-bladed devices. The problem is that these tools are ineffective for turning the ground meat over as it cooks and for lifting the meat out of a skillet when done cooking. At best, they allow users to clumsily push the browned meat around and toward the edge of the cooking pan or skillet, and perhaps over the edge on to a plate or bowl. As a result, cooks are required to use a separate serving tool to efficiently remove their browned meat from the cooking pan, not only lengthening meal preparation times, but also adding to clean up.

Accordingly, the present inventors have recognized a need for improved kitchen hand tools to work with ground meat.

SUMMARY

To address this and one or more other needs or problems, the present inventor devised, among other things, one or more exemplary kits, methods, devices, assemblies, and/or components to facilitate the browning and serving of ground meat. One exemplary embodiment takes the form of a handle with a flat spatula head having a ridged fin structure on its topside. The fin structure extends from the front edge of the spatula back toward the handle, allowing the front edge of the spatula in combination with a front most edge of the fin structure to function as chopper-separator and allowing the spatula portion to facilitate serving. In some embodiments, the fin is laterally offset to one side of the spatula, allowing for easier turning and serving. Also in some embodiments, the centerline of the spatula head is laterally offset from the centerline of the handle, also facilitating turning of the ground meat, and enabling use of the tool as a spatula in other applications.

BRIEF DESCRIPTIONS OF THE DRAWINGS

Various embodiments are described herein with reference to the following attached figures (Figs). These figures are annotated with reference numbers for various features and components, and these numbers are used in the following description as a teaching aid, with like numbers referring to the same or similar features and components.

FIG. 1 is a top perspective view of an exemplary device 100 corresponding to one or more embodiments of the present invention.

FIG. 2 is bottom perspective view of the FIG. 1 device, corresponding to one or more embodiments of the present invention.

FIG. 3 is a front end view of the FIG. 1 device, corresponding to one or more embodiments of the present invention.

FIG. 4 is a plan view of the FIG. 1 device, corresponding to one or more embodiments of the present invention.

DESCRIPTION OF EXEMPLARY EMBODIMENTS

This document, which incorporates drawings and claims, describes one or more specific embodiments of one or more inventions. These embodiments, which are offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

FIGS. 1-4 show various views of exemplary device 100, which provides chopping, turning, and/or serving functions particularly advantageous for browning of ground meat. Device 100, which may be injection molded or additively manufactured of nylon or other food-grade thermoplastic elastomers in combination with silicone or other suitably pliable and durable material, includes an elongated handle portion 110 and a chopper head portion 120. Handle portion 110, which is in the range of 8-10 inches long for example, includes a first end portion 112 with a hook or peg hanger slot 113 and an opposite end portion 114. Opposite end portion 114 is attached to or integral with head portion 120. Chopper head portion 120 includes a laterally offset and generally flat and asymmetrical spatula portion 122 divided into a turner-server portion 123 and a masher portion 124 via a transverse masher (or chopper) fin 125.

More particularly, spatula portion 122 has an asymmetrical generally pentagonal configuration (best seen in FIG. 4.) Chopper-masher fin (or blade) 125, positioned in alignment with the central axis 110A of handle 110, projects upward from a top surface 122T of spatula portion 122, defining a generally T-shaped chopping configuration (best shown in FIG. 3). In the exemplary embodiment, masher-chopper fin 125, which has a nominal thickness in the range of ⅛ to 5/16 inches and height of approximately 1 inch, defines an angle 125A with turner-server portion 123. Angle 125A is approximately 90 degrees; however, other embodiments may user lesser or greater angles. Turner-server portion 123 has a width 123W in the exemplary embodiment that is two or more times width 124W of masher portion 124 to facilitate serving and turner functions. For example, width 123W may be approximately 2.5 inches and width 124W may be approximately 1 inch, which is approximately the same as the height of masher-chopper fin 125. In some embodiments, width 123W is approximately 20, 30, 40, 50, 60, 70, 80, 90, 100, 110, or 120 or more percent greater than width 124W. FIG. 4 shows that in some embodiments, server-turner portion may include holes or perforations 127 to allow draining.

In normal operation, the device can be used to assist in browning ground meat, such as beef, turkey, chicken, or lamp. In particular, after a user has prepared a heated cooking surface to a desired cooking temperature and then placed one or more portions of ground meat on the cooking surface, the user would grasp the device by handle 110 and push the front most edges of the spatula head portion and the chopper-masher fin into one of the portions of ground meat, pushing the edges through the meat to until contact is made with the cooking surface, thereby separating the selected portion of ground meat into at least two smaller portions. The device would then be lifted again and moved to engage the front edges of the tool in a similar fashion with another portion of meat, one of the smaller portions created with the prior operation or another portion yet to be subdivided. In the next operation, the user may elect to use a front most edge portion of the spatula head portion without the chopper-masher fin to subdivide a portion of ground meat. In the next operation, the user can use a side edge of the spatula to subdivide a portion of ground meat. In still other operations, the user may elect to slide the spatula portion under a portion of ground meat such that the spatula portion is between the portion of meat and the cooking surface. The user can then turn the handle of the device to turn the meat over or can lift the meat up to some height before or while turning the handle to release under weight of gravity back to the cooking surface. The user may apply as many of these or similar operations in unlimited combinations as desired to achieve the desired sizing and doneness. At this point, the user may user the device to serve the browned meat from the heated surface, sliding the spatula portion of the device under a portion of browned meat as with a conventional spatula.

CONCLUSION

In the foregoing specification, specific exemplary embodiments have been described. However, one of ordinary skill in the art appreciates that various modifications and changes can be made without departing from the scope of the invention as set forth in the claims herein. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. A device for separating and maintaining separation of ground meat while the meat is being cooked on a heated cooking surface, the device comprising: an elongated handle having first and second ends defining a length dimension and a length of the handle, with the length configured to reduce likelihood of grease from the heated cooking surface from splattering onto the hand of a user holding the handle; a spatula head attached to or extending from the second end of the handle, the spatula head having opposing top and bottom major surfaces bounded by a peripheral edge having first and second edge regions that are generally parallel to the length dimension of the handle and that are spaced apart to define a width of the spatula head in a dimension transverse to the length dimension; a fin blade extending upward from a portion of the top major surface of the spatula head that is intermediate the first and second edge regions; and wherein the fin blade has a height measured from the top major surface that is less than the width of the spatula head and the bottom major surface is configured to enable sliding a portion of the spatula head between the heated cooking surface and cooked or cooking ground meat, thereby enabling lifting, serving, or turning over a portion of the ground meat being cooked.

2. The device of claim 1, wherein the fin blade is generally perpendicular to the top surface.

3. The device of claim 1, wherein the spatula head has a center line between the first and second edge regions that is laterally offset from a central axis of the handle or from the second end of the handle.

4. The device of claim 1, wherein the spatula head is asymmetrical relative to a plane defined by the fin blade.

5. The device of claim 1, wherein the handle has a central axis, and wherein the fin blade is laterally offset from a central line of the spatula head.

6. The device of claim 1, wherein the fin blade attaches to or extends upward from the top major surface to separate the spatula into a narrow region and a wide region, with the wide region having a width that is approximately 20, 30, 40, 50, 60, 70, 80, 90, 100, 110, or 120 or more percent greater than a nominal width of the of the narrow region.

7. The device of claim 1, wherein the spatula head is generally flat.

8. The device of claim 1, wherein the spatula head includes one or more drain holes or slots extending through the top and bottom major surfaces.

9. A device for facilitating separation of ground meat while the meat is being cooked on a heated cooking surface, the device comprising: an elongated handle having first and second ends defining a length dimension and a length of the handle; a spatula head attached to or extending from the second end of the handle, the spatula head having opposing top and bottom major surfaces bounded by a peripheral edge having first and second edge regions that are generally parallel to the length dimension of the handle and that are spaced apart to define a width of the spatula head in a dimension transverse to the length dimension; a fin blade extending upward from a portion of the top major surface of the spatula head that is intermediate the first and second edge regions; and wherein the fin blade has a height measured from the top major surface that is less than the width of the spatula head and the bottom major surface has no vertical projection that would prevent the spatula head from sliding between the heated cooking surface and cooked or cooking ground meat.

10. The device of claim 9, wherein the fin blade is approximately perpendicular to the top surface, and has a front most edge which is at least partly coextensive with a front most edge of the spatula head.

11. The device of claim 9, wherein the spatula head has a center line between the first and second edge regions that is laterally offset from a central axis of the handle or from the second end of the handle.

12. The device of claim 9, wherein the handle has a central axis, and wherein the fin blade is laterally offset from a central line of the spatula head.

13. The device of claim 9, wherein the fin blade attaches to or extends upward from the top major surface to define a narrow region and a wide region, with the wide region having a width that is approximately 20, 30, 40, 50, 60, 70, 80, 90, 100, 110, or 120 or more percent greater than a nominal width of the narrow region.

14. The device of claim 9, wherein the spatula head includes one or more drain holes or slots extending through the top and bottom major surfaces.

* * * * *